United States Patent [19]

Semmelhaack et al.

[11] 4,038,538
[45] July 26, 1977

[54] INTEGER AND FLOATING POINT TO BINARY CONVERTER

[75] Inventors: Carl Frederick Semmelhaack, West Chester; Mark Camillo DiVecchio, Phoenixville, both of Pa.

[73] Assignee: Burroughs Corporation, Detroit, Mich.

[21] Appl. No.: 685,615

[22] Filed: May 12, 1976

Related U.S. Application Data

[62] Division of Ser. No. 605,251, Aug. 18, 1975, Pat. No. 4,007,439.

[51] Int. Cl.² .................................................. G06F 5/00
[52] U.S. Cl. ............................ 235/154; 340/347 DD; 235/156; 364/900
[58] Field of Search ...................... 235/154, 156, 159; 340/347 DD, 172.5; 445/1

[56] References Cited

U.S. PATENT DOCUMENTS

| | | | |
|---|---|---|---|
| 3,742,198 | 6/1973 | Morris | 235/154 |
| 3,961,170 | 6/1976 | DeSandre | 235/154 |

*Primary Examiner*—Charles D. Miller
*Attorney, Agent, or Firm*—Kevin R. Peterson; Edmund M. Chung; Leonard C. Brenner

[57] ABSTRACT

In a data processing system having a plurality of storage units, each unit therein storing in integer or normalized floating point format, an exponent sign bit, an exponent field, an integer/fraction sign bit, and an integer/fraction field, a converter transforms the stored data into pure binary values of selectively the same or the inverse relative order. To convert into the same relative order, the exponent sign bit is complemented if the integer/fraction sign bit is a logical zero and the exponent is complemented if otherwise. Thereafter, the integer/fraction bit is complemented. To convert into the inverse relative order, the exponent sign bit is complemented if the integer/fraction sign bit is a logical one and the exponent field is complemented if otherwise. Also, the integer/fraction field is complemented.

3 Claims, 8 Drawing Figures

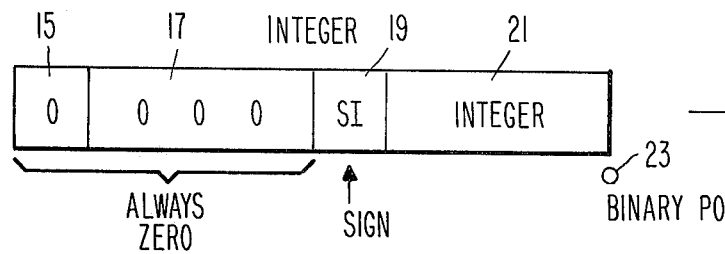
*Fig.2A*
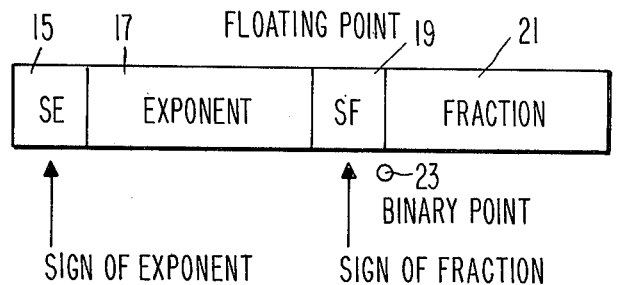
*Fig.2B*
*Fig.2C*
| SIGN | MAGNITUDE | INTERPRETATION | | |
|---|---|---|---|---|
| | | INTEGER | EXPONENT | FRACTION |
| 0 | 111 | +7 | $2^7 = 128$ | +7/8 |
| 0 | 110 | +6 | $2^6 = 64$ | +3/4 |
| 0 | 101 | +5 | $2^5 = 32$ | +5/8 |
| 0 | 100 | +4 | $2^4 = 16$ | +1/2 |
| 0 | 011 | +3 | $2^3 = 8$ | INVALID |
| 0 | 010 | +2 | $2^2 = 4$ | INVALID |
| 0 | 001 | +1 | $2^1 = 2$ | INVALID |
| 0 | 000 | +0 | $2^0 = 1$ | 0 |
| 1 | 111 | −1 | $2^{-1} = 1/2$ | INVALID |
| 1 | 110 | −2 | $2^{-2} = 1/4$ | INVALID |
| 1 | 101 | −3 | $2^{-3} = 1/8$ | INVALID |
| 1 | 100 | −4 | $2^{-4} = 1/16$ | INVALID |
| 1 | 011 | −5 | $2^{-5} = 1/32$ | −5/8 |
| 1 | 010 | −6 | $2^{-6} = 1/64$ | −3/4 |
| 1 | 001 | −7 | $2^{-7} = 1/128$ | −7/8 |
| 1 | 000 | −8 | $2^{-8} = 1/256$ | −1 |

Fig.5

| D | E | A | B | C |
|---|---|---|---|---|
| 0 | 0 | 0 | 0 | 0 |
| 0 | 1 | 0 | 0 | 1 |
| 1 | 0 | 0 | 1 | 0 |
| 1 | 1 | 1 | 0 | 0 |

Fig.6

| D | E | A | B | C | X | Y | Z | RESET |
|---|---|---|---|---|---|---|---|---|
| 0 | 0 | 0 | 0 | 0 | 0 | 0 | 0 | 0 |
| 0 | 0 | 0 | 0 | 0 | 0 | 0 | 1 | 1 |
| 0 | 0 | 0 | 0 | 0 | 0 | 1 | 0 | 1 |
| 0 | 0 | 0 | 0 | 0 | 0 | 1 | 1 | 1 |
| 0 | 0 | 0 | 0 | 0 | 1 | 0 | 0 | 1 |
| 0 | 0 | 0 | 0 | 0 | 1 | 0 | 1 | 1 |
| 0 | 0 | 0 | 0 | 0 | 1 | 1 | 0 | 1 |
| 0 | 0 | 0 | 0 | 0 | 1 | 1 | 1 | 1 |
| 0 | 1 | 0 | 0 | 1 | 0 | 0 | 1 | 0 |
| 0 | 1 | 0 | 0 | 1 | 0 | 1 | 1 | 1 |
| 0 | 1 | 0 | 0 | 1 | 1 | 0 | 1 | 1 |
| 0 | 1 | 0 | 0 | 1 | 1 | 1 | 1 | 1 |
| 1 | 0 | 0 | 1 | 0 | 0 | 1 | 0 | 0 |
| 1 | 0 | 0 | 1 | 0 | 0 | 1 | 1 | 0 |
| 1 | 0 | 0 | 1 | 0 | 1 | 1 | 0 | 1 |
| 1 | 0 | 0 | 1 | 0 | 1 | 1 | 1 | 1 |
| 1 | 1 | 1 | 0 | 0 | 1 | 0 | 0 | 0 |
| 1 | 1 | 1 | 0 | 0 | 1 | 0 | 1 | 0 |
| 1 | 1 | 1 | 0 | 0 | 1 | 1 | 0 | 0 |
| 1 | 1 | 1 | 0 | 0 | 1 | 1 | 1 | 0 |

INTEGER AND FLOATING POINT TO BINARY CONVERTER

This is a division of application Ser. No. 605,251, filed Aug. 18, 1975, now U.S. Pat. No. 4,007,439.

BACKGROUND OF THE INVENTION

As speed requirements of computer systems have increased, systems employing greater numbers of parallel processors have been developed. One such system, has in the order of 64 parallel processors, see U.S. Pat. No. 3,537,074, issued Oct. 27, 1970 to R. A. Stokes et al, and assigned to the assignee of the present invention.

Present day large computer systems incorporating a high degree of parallelism often include a plurality of widely scattered registers. When data in these registers are to be compared, the propagation delays involved in transmitting data from each register to a central comparator and back consumes precious processing time and limits the overall throughput of the system.

Certain calculations in large parallel computer systems require the determination of which register(s) in a plurality of scattered registers are storing either the highest or lowest value numerical data.

When such numerical data is stored in either floating point or integer format, determination of which register is storing either the highest or the lowest data value requires complex parallel or time consuming serial data comparison.

Conversion of all data to binary equivalents greatly eases the comparison task but such comparison is in itself relatively complex and costly in terms of hardware or firmware. Great simplification is achieved in the overall determination task by merely converting the stored data to a binary representation which maintains the same relative magnitude ordering of the original stored data but not necessarily the exact binary equivalents thereof.

It is therefore an object of the present invention to provide a converter to transform a plurality of floating point or integer values into binary values of selectively the same or the inverse magnitude ordering.

It is a further object of the present invention to provide such a converter capable of implementation with relatively inexpensive components combined to function in a high speed efficient manner.

SUMMARY OF THE INVENTION

The above and other objects of the invention are realized by converting stored floating point or integer data into binary data having selectively either the same or the inverse relative magnitude ordering. The stored integer or floating point data includes an exponent sign bit, an exponent field, an integer/fraction sign bit, and an integer/fraction field. To convert into the same relative order, the exponent sign bit is complemented if the integer/fraction sign bit is a logical zero and the exponent field is complemented if the otherwise. Also, the integer/fraction bit is complemented. To convert into the relative inverse relative order, the exponent sign bit is complemented if the integer/fraction sign is a logical one and the exponent field is complemented if otherwise. Also, the integer/fraction field is complemented.-;

The system configuration and operational details given above have been presented in simplified form. Other features of the invention will become more fully apparent in the drawings and detailed description presented hereinafter.

BRIEF DESCRIPTION OF THE DRAWINGS

FIG. 2A presents the integer format used in the preferred embodiment of the invention;

FIG. 2B presents the floating point format used in the preferred embodiment of the invention;

FIG. 2C is a table demonstrating the two's complement normalized numerical format used in the invention;

FIG. 5 is a truth table for a decode circuit shown in FIG. 1;

FIG. 6 is a truth table for a compare circuit shown in FIG. 1.

DETAILED DESCRIPTION OF THE INVENTION

Figure 1:
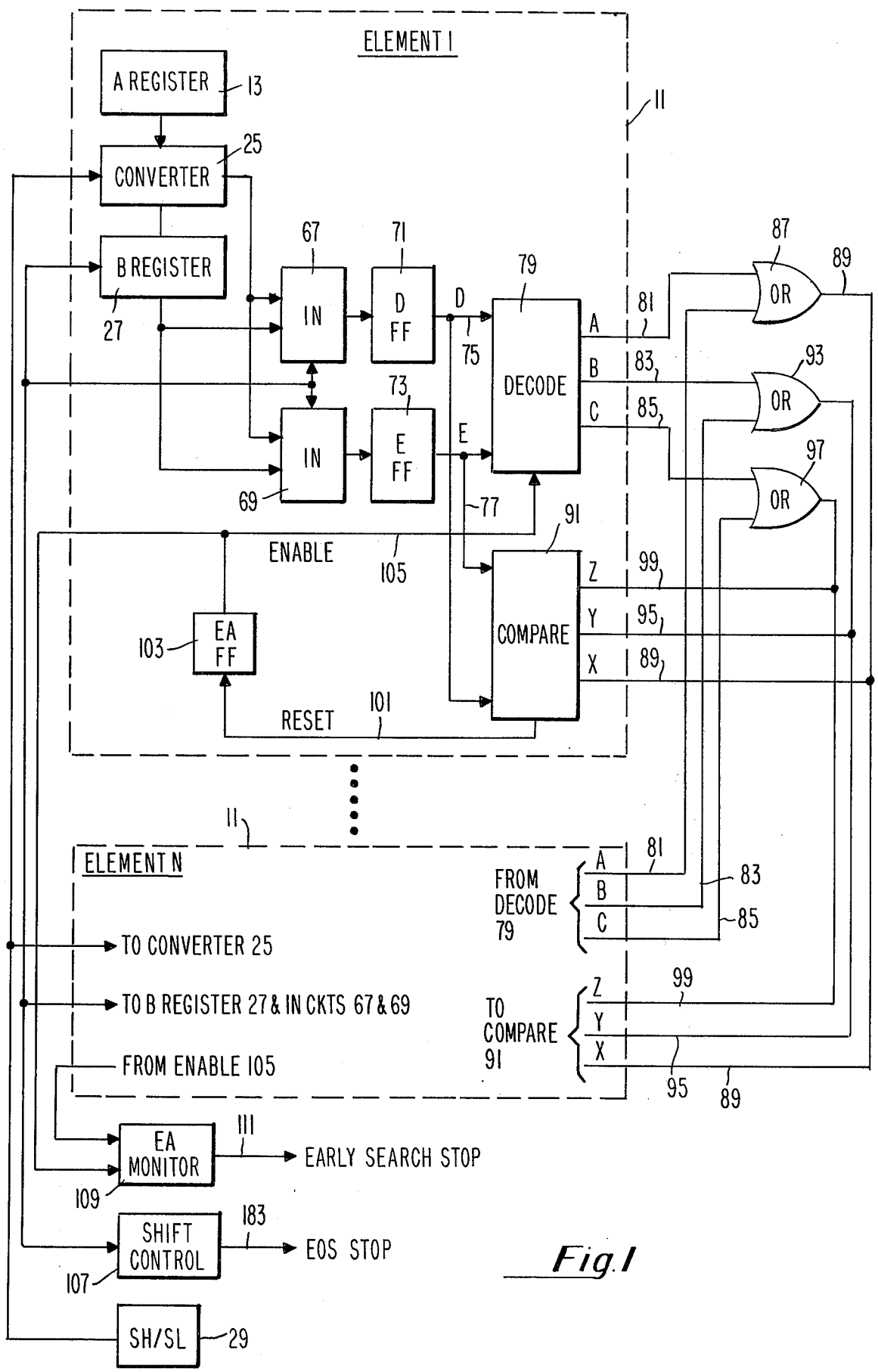
FIG. 1 is a functional block diagram showing the features of the present invention.

The integer and floating point converting method and apparatus of the present invention resides in a large parallel processing environment having a plurality of processing elements, see FIG. 1. Each element 11 includes an A register 13 for storing numerical data in normalized floating point or integer formats. Routinely, the A registers 13 store numerical data temporarily before, during or after processing; i.e., multiplication, division, addition, subtraction, etc. Occasionally however, it becomes necessary to compare data in all the A registers 13 to determine which A register(s) 13 is storing either the highest or lowest value numerical data. In accord with the present invention the determination process involves two basic steps wherein the numerical data in each A register 13 is first converted into a pure binary pattern and thereafter all binary patterns are searched two-bits-at-a-time to determine which binary pattern(s) has selectively either the highest or the lowest relative value.

Each A register 13 stores two's complement numerical data which may be in either integer, see FIG. 2A, or normalized floating point, see FIG. 2B, format. In both integer and floating point format, a first bit 15, hereafter referred to as exponent sign bit 15, functions as the most significant bit when viewing the format as a pure binary number. The exponent sign bit 15 is always set to a logical zero in the integer format and signifies the sign of the exponent in floating point format with a logical zero signifying a positive exponent and a logical one signifying a negative exponent.

Immediately following the exponent sign bit 15 in both integer and floating point formats is a first field of bits hereinafter referred to as the exponent field 17. In integer format all bits in the exponent field 17 are set to logical zero. In floating point format the exponent field 17 represents the value of the exponent, see FIG. 2C. The exponent field 17 may comprise three bits as shown in FIG. 2C or more if required for the numerical calculation range of a specific application or computer system. An exponent field 17 comprising seven bits has been found to be satisfactory for a wide range of applications.

Following the exponent field 17 is integer/fraction sign bit 19 which represents the integer sign in integer format and fraction sign in floating point format. A logical zero integer/fraction sign bit 19 signifies a positive integer or fraction whereas a logical one integer/fraction sign bit 19 signifies a negative integer or fraction.

A second field of bits 21 hereinafter referred to as the integer/fraction field 21 follows the integer/fraction sign bit 19. The integer fraction field 21 represents the integer value in integer format and the fraction value in floating point format. The integer/fraction field 21 may comprise three bits as shown in FIG. 2C or more if required for the numerical calculation range of a specific application or computer system. An integer/fraction field 21 comprising 23 bits has been found to be satisfactory for a wide range of applications.

The binary point 23 is considered to be following the integer/fraction field 21 in integer format and preceding the integer/fraction field 21 in floating point format.

As illustrated in FIG. 2C, the fraction portion of the floating point format is normalized. Thus, 0001 which represents a positive $\frac{1}{8}$ value is not valid. If $+\frac{1}{8}$ were thus permitted the eight bit representations 0010 0001 and 0000 0100 both would have the value of $+\frac{1}{2}$. To assure only one representation for each numerical value, the fraction is normalized as shown in FIG. 2C by forbidding (or declaring invalid) fractions having their most significant bit the same logical value as the integer/fraction sign bit 19. Likewise, to assure only one representation for the numerical value "zero," the floating point zero is defined as the number having its exponent sign bit 15 at logical one and all other bits at logical zero.

Referring again to FIG. 1, it is appreciated that the floating point or integer representations discussed above are temporarily stored in a plurality of A registers 13 during the normal course of computer computations. It matters not whether the numerical data is processed serially or in parallel into and out of the A registers 13. It is important that at a given period of time in the calculations a plurality of A registers 13 are storing either integer or floating point data and that it is desired to determine which A register(s) 13 is storing either the highest or lowest value data. Such determination begins with data conversion.

The numerical data in each A register 13 is fed in parallel through an associated converter 25 to an associated B register 27 which serves to store the converted numerical data. Each converter 25 operates under the control of a select high/select low control unit 29 which generates a logical one or a logic zero depending on whether it is desired to search for the A register 13 storing the lowest or highest numerical data. Conversion differs for a high register search and a low register search.

To select the A register(s) 13 storing the highest value of numerical data four conversion steps are followed. First, the exponent sign bit 15 is complemented if the integer/fraction sign bit 19 is a logical zero. Second, the exponent field 17 is complemented if the integer/fraction sign bit 19 is a logical one. Third, the integer/fraction field 21 remains unchanged. Finally, the integer/fraction sign bit 19 is complemented.

Figure 3:
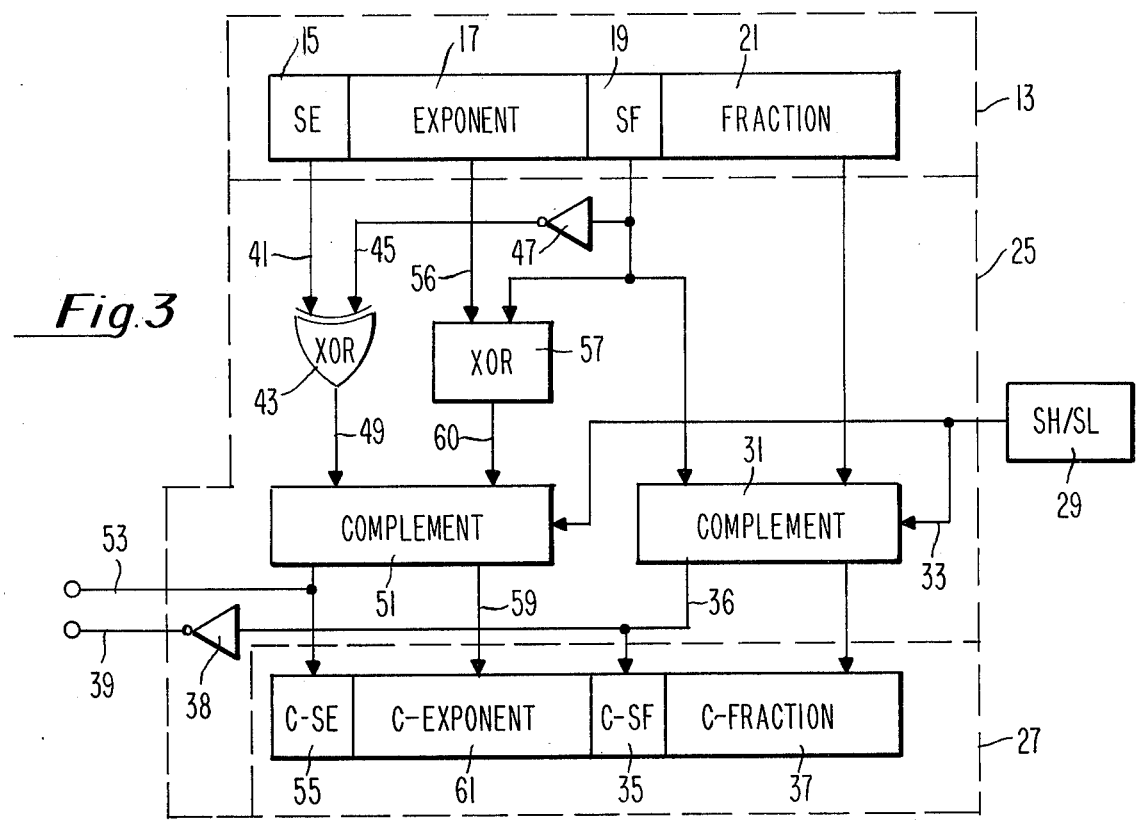
FIG. 3 is a logic diagram of a comparator shown in FIG. 1.

To select the A register(s) 13 storing the lowest value of numerical value another set of four conversion steps is followed. First, the exponent sign bit 15 is complemented if the integer/fraction sign bit 19 is at a logical one. Second, the exponent field 17 is complemented if the integer/fraction sign bit 19 is at a logical zero. Third, the integer/fraction field 21 is complemented. Finally, the integer/fraction sign bit 19 remains unchanged. The functions of converter 25 are implemented using standard "off-the-shelf" hardware, see FIG. 3. All bits of the integer/fraction field 21 and the integer/fraction sign bit 19 are fed from the A register 13 to an integer/fraction complement circuit 31 controlled by the select high/select low control unit 29. A logical zero from the select high/select low control unit 29 to the control input 33 of the integer/fraction complement circuit 31 will permit all bits to pass therethrough unchanged to the appropriate converted integer/fraction field 37 and integer/fraction sign bit 35 portions of the B register 27. Conversely, a logical one from the select high/select low control unit 29 will cause all bits to be complemented before passing to the B register 27.

The simple function of the integer/fraction complement circuit 31 may be physically realized in many different ways well known to those skilled in the logic design art. As an example, many off-the-shelf adders available today also perform subtraction by complementing one input. Thus, if one input is held at logical zero, the other may be added to it or effectively passed through the adder unchanged. Likewise, with one input at zero, the subtraction function will serve to complement the other input. In a working model of the invention, a satisfactory integer/fraction complement circuit 31 has been fabricated using the arithmetic logic unit/function generator MC10181 available as a standard item from Motorola, Inc. The MC10181 is only a four bit unit and therefore parallel operation of two or more is required to handle integer/fraction fields 21 containing more than three bits.

The converted integer/fraction sign bit output 36 of the integer/fraction complement circuit 31 is logically inverted by a standard logic inverter 38 to produce an inverter output 39 which is the complement of the integer/fraction sign bit 19 when the integer/fraction field 21 is not complemented and which is logically equal to the integer/fraction sign bit 19 otherwise.

The exponent sign bit 15 of the A register 13 is applied to a first input 41 of an exclusive OR circuit 43. The second input 45 of the exclusive OR circuit 43 is fed to the output of an inverter 47 which complements the integer/fraction sign bit 19 stored in A register 13. The output 49 of the exclusive OR circuit 43 is fed through an exponent complement circuit 51 and is outputted therefrom on data line 53 and stored as the converted exponent sign bit 55 in the B register 27.

The exponent complement circuit 51 operates under the control of the select high/select low control circuit 29 to either pass bits through unchanged or to complement same. As such the exponent complement circuit 51 is identical to the integer/fraction complement circuit 31 and may be physically realized as above described.

The exponent complement circuit 51 also serves to control the complementing of the exponent field 17 stored in A register 13. To this end, all bits of the exponent field 17 are fed through data path 56 to an exclusive OR system 57. Another input 59 is provided to the exclusive OR system 57 from the integer/fraction sign bit 19 stored in A register 13. The exclusive OR system 57 functions as a plurality of exclusive OR circuits, one for each bit in the exponent field 17 and may be fabricated as a plurality of standard exclusive OR circuits. The output 60 of the exclusive OR system 57 is fed through the exponent complement circuit 51 into the converted exponent field 61 of B register 27.

As noted, the select high/select low control circuit 29 merely serves to generate a logical one or a logical zero depending on whether a search for the high register(s) or low register(s) is desired. As such, the control circuit 29 represents no more than a flip-flop output whose inputs are generated by decision logic within the computer environment in which the present invention is embodied.

Figure 4:
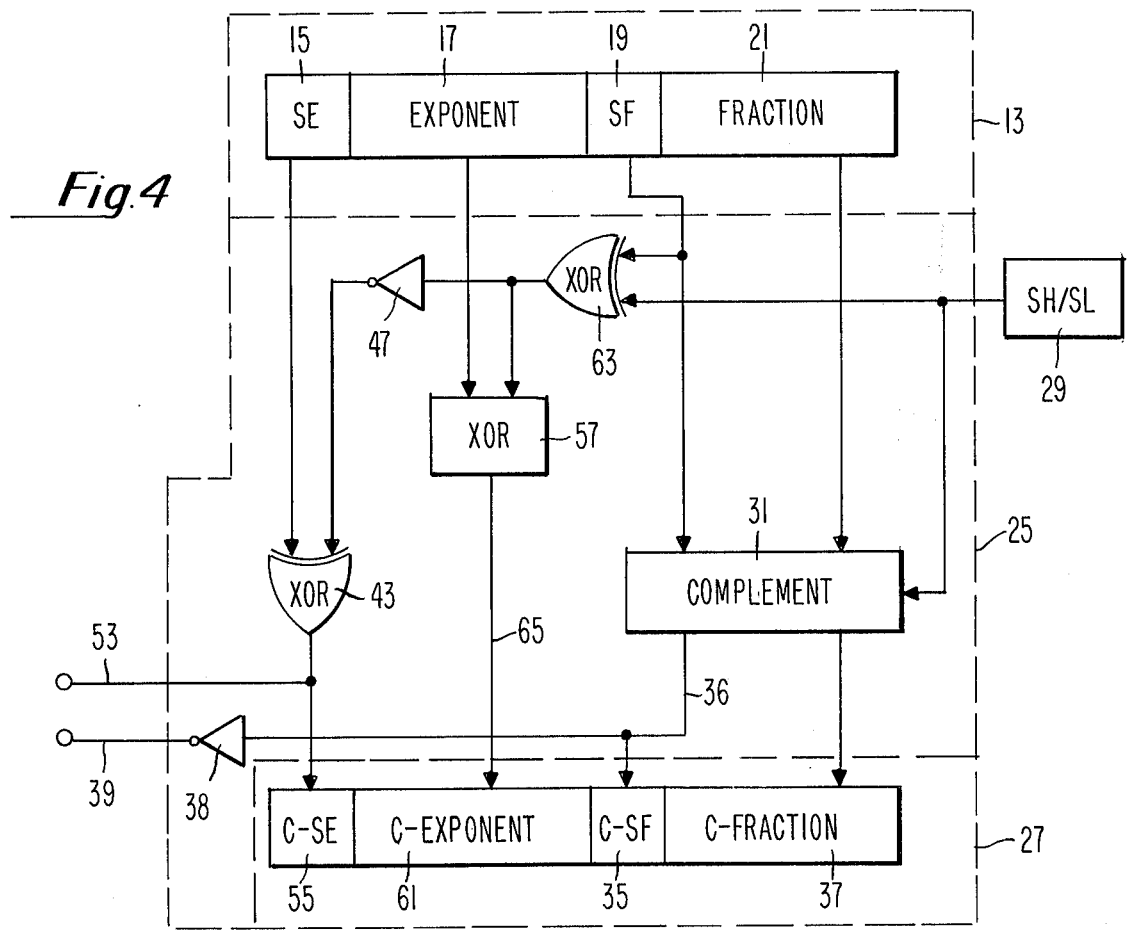
FIG. 4 is an alternate logic diagram for the comparator of FIG. 3.

FIG. 4 represents an alternative approach to the realization of the converter 25. As compared to the converter 25 realization of FIG. 3, it is seen that the integer/fraction portions remain the same and that the differences involve the substitution of an exclusive OR circuit 63 for the exponent complement circuit 51 and the slight rewiring necessitated by the substitution. The exclusive OR 63 is inputted by the integer/fraction sign bit 19 and the select high/select low control circuit 29. The exclusive OR circuit 63 drives the inverter 47 and the exclusive OR system 57. The output 60 of the exclusive OR system 57 provides directly the converted exponent field 61. Following conversion, the process of searching for the high or low register commences, see again FIG. 1. As will be discussed in greater detail hereinafter, the converted data in B register 27 is shifted two bits at a time into a first and second input select circuit 67 and 69, respectively. Generally, the input circuits 67 and 69 merely pass bits from the B register 27 to the D flip-flop and the E flip-flop 73, respectively. However, as will be discussed later, at the first step of a search cycle, two bits are passed from the converter 25, one bit to the D flip-flop 71 and the other bit to the E flip-flop 73.

The D output 75 of D flip-flop 71 and E output 77 of E flip-flop 73 are inputted to a decode circuit 79 having an A output 81, a B output 83, and a C output 85. FIG. 5 illustrates in truth table fashion the function of the decode circuit 79. It can be seen that the decode circuit 79 provides basically a binary to 1- in-3 conversion.

The A output 81 of decode circuit 79 feeds an OR circuit 87. As shown, the OR circuit 87 is fed by all A outputs 81, one for each element 11 involved in the high/low register search. The output of OR circuit 87 is fed as the X input 89 of a compare circuit 91. As shown, there is one compare circuit 91 for each element 11 involved in the search.

Likewise, the B output of decode circuit 79 feeds an OR circuit 93. The output of OR circuit 93 is fed as the Y input 95 of the compare circuit 91. Finally, the C output 85 of the decode circuit 79 feeds an OR circuit 97. The output of OR circuit 97 is fed as the Z input 99 of the compare circuit 91.

The function of the compare circuit 91 is illustrated in truth table fashion in FIG. 6. As shown, the compare circuit 91 outputs a logical zero on a reset line 101 (see FIG. 1) when the associated D output 75 and E output 77 represent a binary number equal to or greater than any other D output 75 and E output 77 generated by the other elements 11 involved in the high/low register search.

A logical one on reset line 101 resets an element active flip-flop 103 which in turn generates a logical level on line 105, which as will be detailed hereinafter, effectively removes the associated element 11 from the high/low search.

The above procedure of examining data in the B registers 27 two bits at a time is continued under the control of shift control unit 107. Shift control unit 107 shifts bits out of the B register 27 two bits at a time from the most significant to the least significant bits. The shifting procedure is continued until all bits have been shifted out of the B register 27 and have been processed through the decode circuit 79, the OR circuits 87, 93 and 97, and the compare circuit 91. After all bits have been shifted through the B register 27 only those elements 11 having A registers 13 storing selectively either the highest or lowest value data remain active as indicated by the element activity flip-flop 103.

The search procedure may be concluded early if only one element activity flip-flop 103 remains active at any point during the search. The element activity flip-flops 103 are monitored by element activity monitor 109. Element activity monitor 109 monitors all element activity flip-flops 103 and generates an early search stop signal 111 when one and only one element activity flip-flop remains active. The element activity monitor 109 may be fabricated from a counter which is decreased one count each time element activity flip-flop 103 indicates that its associated element 11 is no longer active and increased one count each time a new element activity flip-flop 103 indicates that an element 11 has become active. Alternative methods of physically realizing the element activity monitor 109 may also be used. For example, the element activity monitor 109 may be fabricated as an exclusive OR circuit which functions to generate the early search/stop signal when one and only one element activity flip-flop 103 remains active.

The integer and floating point to binary converting system of the present invention has been described in a specific embodiment involving the search for a high data storing register or a low data storing register. It is appreciated that other system configurations and applications may be envisioned and implemented which are not beyond the scope of this invention. Further, although the present invention has been described with a certain degree of particularity, it should be understood that the present disclosure has been made by way of example and that changes in the combination and arrangement of parts obvious to one skilled in the art, may be resorted to without departing from the scope and spirit of the invention.

What is claimed is:

1. A converter for use in a logic element storing a numerical digital value having an exponent sign bit, an exponent field, an integer/fraction sign bit, and an integer/fraction field, said converter comprising:

controller means having a first and a second logical state for controlling conversion of said numerical digital value;

means for complementing said exponent sign bit when both said integer/fraction sign bit equals a logical zero and said controller means is in said first logical state and when both said integer/fraction sign bit equals a logical one and said controller means is in said second logical state;

means for complementing said exponent field when both said integer/fraction sign bit equals a logical one and said controller means is in said first logical state and when both said integer/fraction sign bit equals a logical zero and said controller means is in said second logical state;

means for complementing said integer/fraction field when said controller means is in said second logical state; and means for complementing said integer/fraction bit when said controller means is in said first logical state.

2. A converter for use in a logic element storing a numerical digital value having an exponent sign bit, and an exponent field, an integer/fraction sign bit, and an integer/fraction field, said converter comprising:

exclusive OR means having an output for combining in exclusive OR fashion the exponent sign bit with the complement of the integer/fraction sign bit and for like combining each bit individually of the exponent field with the integer/fraction sign bit and for outputting all results of said combining;

control means having a first and a second logical state for controlling the conversion of said numerical digital value;

complementing means coupled to the output of said exclusive OR means, the integer/fraction sign bit, and the integer/fraction field, said complementing means controlled by said control means for complementing each bit received when said control means is in its first logical state and for passing uncomplemented each bit received when said control means is in its second logical state.

3. A converter for use in a logic element storing a numerical digital value having an exponent sign bit, an exponent field, an integer/fraction sign bit, and an integer/fraction field, said converter comprising:

control means having a first and a second logical state for controlling conversion of said variable digital value;

a first exclusive OR circuit fed by said control means and by the integer/fraction sign bit;

a second exclusive OR circuit fed by said first exclusive OR circuit and by each bit of the exponent field whereby each bit in the exponent field is combined in exclusive OR fashion with the output of said first exclusive OR circuit;

an inverter circuit complementing the output of said first exclusive OR circuit;

a third exclusive OR circuit fed by the exponent sign bit and by the output of said inverter circuit; and complementing means receiving the integer/fraction sign bit and each bit in the integer/fraction field, said complementing means being controlled by said control means for complementing each bit received when said complementing means is in its first logical state and for passing uncomplemented each bit received when said control means is in its second logical state.

* * * * *